Oct. 10, 1967  E. G. BAILEY  3,346,671
VERTICAL KILN OPERATION USING SHROUDED FUEL
Filed Sept. 9, 1963
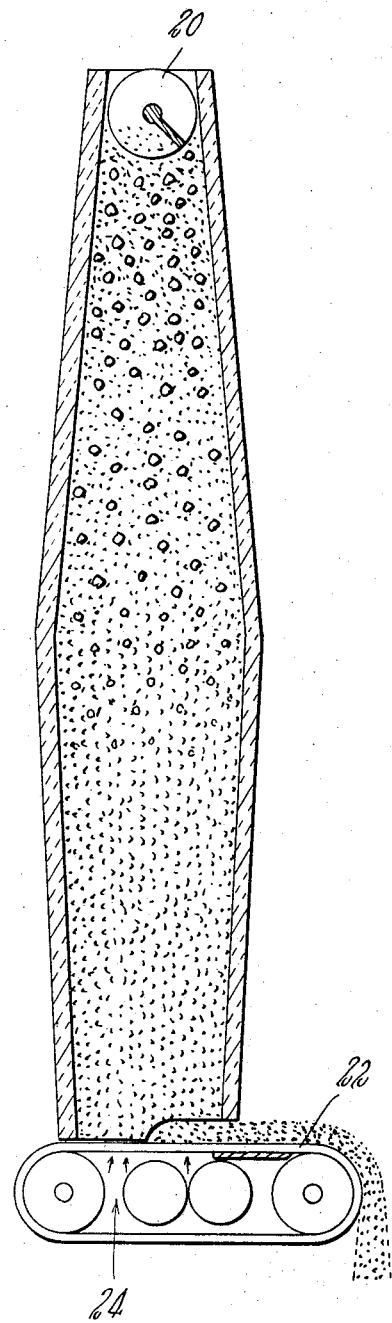

United States Patent Office 3,346,671
Patented Oct. 10, 1967

3,346,671
VERTICAL KILN OPERATION USING SHROUDED FUEL
Ervin G. Bailey, Bethlehem Township, Pa., assignor to Bailey Inventions, Inc., Bethlehem Township, Pa., a corporation of Pennsylvania
Filed Sept. 9, 1963, Ser. No. 307,418
2 Claims. (Cl. 263—53)

This invention relates to the production of lime by the burning of limestone in a vertical kiln into which solid carbonaceous fuel is fed with the limestone as a charge which descends continuously through the kiln as the fuel burns, and the burned lime is mechanically removed from the bottom of the kiln.

Various methods have been tried to control the temperature in vertical lime kilns in order to obtain uniform quality and prevent overburning and undue hardening of the lime. The injection of hot gases of combustion into the middle zone of a vertical kiln from an outside fuel bed furnace was improved somewhat by the addition of gas recirculation using the Eldred process. It was improved also by the use of gas producers supplied with preheated secondary air from the lower zone of the kiln, to burn the producer gas in the middle zone of the kiln.

It is an object of this invention to provide a mode of operation which will permit the lime industry to use a vertical kiln installation, with accurate temperature control, higher efficiency, and lower costs.

This object of the invention is accomplished by so designing and operating a vertical kiln, that the burning of fuel, which is fed in at the top of the kiln with other constituents of the charge, is prevented while the fuel descends through the upper zone of the kiln, and commences only when the fuel has reached the middle zone of the kiln where the highest temperature is needed. Gaseous products of combustion produced in this middle zone of substantially constant highest temperature ascend through the continuously descending charge, with resultant heat exchange. Combustion air is introduced at the bottom of the kiln and flows upward through the reacted materials as they descend below the zone of greatest temperature, cooling them for removal at the bottom of the kiln.

With such delay, the fuel is prevented from being burned at levels which are too high in the kiln for greatest efficiency.

This delay of combustion is achieved by feeding the fuel to the kiln as individual pieces, each of which is encased or enclosed, or has its external surface otherwise sealed, within a shroud in the form of an adherent enveloping coat of a solid but meltable inorganic refractory material, to seal the surfaces of the fuel from direct exposure to air or gas, until it is exposed to a temperature above the melting temperature of the shrouding material. The shrouding material should be chemically inert to the gases ascending through the kiln, namely to oxygen, nitrogen, carbon dioxide, and $H_2O$ at temperatures up to at least about 1800° F. Its flow point is so chosen as to be sure that the shroud is melted away from the fuel to expose the fuel surfaces to air ascending through the charge at a selected level, according to the gas temperature gradient vertically through the charge. Thus, in a lime kiln, this flow point may be in the range of 1600–1800° F.

Since the shrouded fuel above the selected melting level is shielded from all the ascending gases, an additional inherent cause of improved efficiency is that any $CO_2$ or $H_2O$ present in those gases does not contact hot carbon enclosed within the shrouds above the deshrouding level. The hot carbon is thus prevented from reducing $CO_2$ to CO or the $H_2O$ to $H_2$ at such high levels that resulting combustible CO and $H_2$ gases can escape unburned with the waste gases and represent heat losses. Such losses do not occur when such reduction cannot take place above the deshrouding level. The temperatures and air present then insure complete oxidation of substantially all combustible gases generated in the kiln before they possibly can reach the top of the charge so that their entire heat may be brought to bear within the kiln on heat exchange pre-heating of the incoming charge.

A preferred shrouding material for lime kiln operation is lime mixed with silica, modified with other ceramic or refractory ingredients to produce a refractory having a melting point of the order of 1600–1800° F. A fuel such as coke may be shrouded with such material, for example, by pulverizing the refractory, forming a slurry and then dipping coke or other prepared metallurgical size carbon fuel pieces into the slurry, removing and drying to coat the pieces of fuel with an adherent protective coat. Hot fuel, as it comes directly from the coking operation, may be dropped into a slurry so as to draw the refractory into the pores of the fuel as it cools. The result will be to improve the adhesion of the shroud.

The sole figure shows diagrammatically a kiln adapted for use in accordance with this invention. It has a generally circular configuration and conical walls tapering to a maximum diameter approximately midway of the height of the kiln. The top of the kiln is provided with a worm feed 20 and the bottom of the kiln is provided with a mechanical ejecting system in the form of an endless chain grate conveyor 22 or other suitable mechanisms.

Crushed limestone can thus be fed into the top of the kiln in such proportions with respect to the shrouded fuel (coke, charcoal, or other carbonaceous low volatile material, of sound structure so that it does not crush) that a maximum temperature in the kiln will be developed approximately midway of the height of the kiln with the gaseous products of fuel combustion rising through the kiln and acting to melt off the shroud from the fuel and thereabove to transfer heat to the incoming limestone-fuel charge.

Meanwhile the combustion-sustaining air introduced at atmospheric pressure at the bottom of the kiln at 24 rises through the reacted calcined lime as it descends toward the bottom of the kiln, cooling it for removal by the ejector conveyor and preheating the air for more efficient combustion with the fuel in the zone where the fuel first becomes exposed to the ascending heated air.

The air supply proper to maintain the operation can be controlled from analysis of the combustion gases, including the $CO_2$ produced by the calcining of the calcium carbonate.

The size of the cores of fuel encased in the shrouding material, the thickness of the shroud and the speed of downward travel of the entire charge affect the rate of combustion but if the amount of excess air is controlled by gas analysis, or otherwise, the most efficient operation can be attained and satisfactorily maintained.

The three-zone arrangement, namely, a middle height combustion zone with a preheating exchange zone provided above the combustion zone and a cooling zone below the combustion zone, provides high operating efficiency, the ascending air cooling the descending charge below the combustion zone and the gases of combustion heating the incoming charge above the combustion zone, thereby preheating combustion air, and cooling the waste gases of combustion.

The drawing shows the vertical kiln operating as a chimney under natural draft with the air entering through and around the moving grate, and discharging gases freely from the top to the air. The product output could be increased at the same temperature of operation by adding forced, and or induced, draft by means of suitable air piping and fans at the bottom and top, interconnecting with the grate and the feeder.

A similar vertical kiln of suitable size and height having provision for sufficient air supply and the required higher temperature (2300–2400° F.) can produce standard Portland Cement Clinker, instead of using the present standard rotary kiln. Suitable shrouding of the proper composition would be used to coat the coke fuel for the higher temperatures required to sinter the cement clinker.

What is claimed is:

1. The method of improving the operating efficiency of a vertical kiln having a preheating zone, a combustion zone and a cooling zone characterized by the fact that inorganic material to be treated is loosely intermixed with individual pieces of solid carbonaceous fuel with said fuel pieces being separately encased with individual shrouds of a solid meltable refractory material, inert to $O_2$ and $CO_2$, to from a charge, feeding the charge to the preheating zone, descending the charge vertically in counterflow relation to gases ascending therethrough as the result of feeding combustion air into the cooling zone of the kiln, which ascending air reacts with said exposed fuel after the shrouds have been melted away to heat the charge to the desired maximum treating temperature in the combustion zone of the kiln above the melting point of said shrouds but below the melting point of said inorganic material, and the resulting gases of combustion escape through the incoming charge, thereby preheating the charge, and the upflowing combustion air is preheated as it cools the treated inorganic material as the latter descends through the cooling zone of the kiln and is removed from the bottom of the kiln as solid finished product with none of said carbonaceous fuel being consumed until it descends in said kiln to the combustion zone wherein the temperature is high enough to melt said shrouds away from said carbonaceous fuel pieces.

2. The method as claimed in claim 1, wherein the kiln is a lime kiln and wherein the inorganic material fed into the kiln in loose admixture with the shrouded fuel is limestone and the finished product is calcined lime.

References Cited

UNITED STATES PATENTS

| | | | |
|---|---|---|---|
| 1,895,284 | 1/1933 | Hay | 263—29 X |
| 2,654,589 | 10/1953 | Somogyi | 263—29 |

FOREIGN PATENTS

| | | |
|---|---|---|
| 241 | 1902 | Great Britain. |

FREDERICK L. MATTESON, Jr., *Primary Examiner.*

D. A. TAMBURRO, *Assistant Examiner.*